US009058151B2

(12) United States Patent
Chou

(10) Patent No.: US 9,058,151 B2
(45) Date of Patent: Jun. 16, 2015

(54) HANDLE MODULE, HARD DISK DRIVE ASSEMBLY, AND SERVER

(71) Applicant: Cal-Comp Electronics & Communications Company Limited, New Taipei (TW)

(72) Inventor: Chien-Tsai Chou, New Taipei (TW)

(73) Assignee: Cal-Comp Electronics & Communications Company Limited, New Taipei (TW)

( * ) Notice: Subject to any disclaimer, the term of this patent is extended or adjusted under 35 U.S.C. 154(b) by 324 days.

(21) Appl. No.: 13/846,868

(22) Filed: Mar. 18, 2013

(65) Prior Publication Data

US 2014/0237770 A1 Aug. 28, 2014

(30) Foreign Application Priority Data

Feb. 22, 2013 (TW) ............................ 102106306 A

(51) Int. Cl.
*H05K 5/00* (2006.01)
*G06F 1/16* (2006.01)
*G06F 1/18* (2006.01)

(52) U.S. Cl.
CPC . *G06F 1/16* (2013.01); *Y10T 16/44* (2015.01); *G06F 1/187* (2013.01)

(58) Field of Classification Search
USPC ............ 361/679.01, 679.02, 679.26, 679.31, 361/679.33, 679.34, 728–732; 439/527, 439/536
See application file for complete search history.

(56) References Cited

U.S. PATENT DOCUMENTS

| | | | | |
|---|---|---|---|---|
| 6,891,723 | B1 * | 5/2005 | Lin et al. | 361/679.33 |
| 7,023,693 | B2 * | 4/2006 | Yuan et al. | 361/679.39 |
| 7,423,869 | B2 * | 9/2008 | Su | 361/679.33 |
| 7,540,574 | B2 * | 6/2009 | Wu et al. | 312/223.2 |
| 2012/0097623 | A1 * | 4/2012 | Zhang et al. | 211/26 |

FOREIGN PATENT DOCUMENTS

| | | |
|---|---|---|
| TW | M244715 | 9/2004 |
| TW | M309189 | 4/2007 |
| TW | M361691 | 7/2009 |

* cited by examiner

*Primary Examiner* — Hung S Bui
(74) *Attorney, Agent, or Firm* — Jianq Chyun IP Office

(57) ABSTRACT

A handle module, a hard disk drive (HDD) assembly, and a server are provided. The server includes a case with a mounting hole, a main board, and the HDD assembly. The HDD assembly includes a tray with two slide rails and a fixing hole, a HDD, the handle module, and a rubber pad. The handle module includes a handle with a body plate and a sidewall, a backing sheet, and a switch button. The body plate has a first opening and an inner surface. The sidewall has a second opening. The switch button is disposed between the backing sheet and the inner surface and has a first protrusion protruded out of the first opening and a second protrusion. The number of components disassembled from the server relies on the relative position between the second protrusion and the second opening, the fixing hole, and the mounting hole.

20 Claims, 10 Drawing Sheets

HANDLE MODULE, HARD DISK DRIVE ASSEMBLY, AND SERVER

CROSS-REFERENCE TO RELATED APPLICATION

This application claims the priority benefit of Taiwan application serial no. 102106306, filed on Feb. 22, 2013. The entirety of the above-mentioned patent application is hereby incorporated by reference herein and made a part of this specification.

BACKGROUND OF THE INVENTION

1. Field of the Invention

The present invention generally relates to a handle module, a hard disk drive (HDD) assembly, and a server, and more particularly, to a handle module which has a simple structure and is easy to assemble, and a HDD assembly and a server using the same.

2. Description of Related Art

For the convenience of assembly and disassembly, a handle is usually installed on a removable HDD assembly in a server. Thus, a user can push the removable HDD assembly to insert it into the server or hold the handle to take the removable HDD assembly out of the server conveniently.

SUMMARY OF THE INVENTION

Accordingly, the present invention is directed to a handle module which has a simple structure and is easy to assemble.

The present invention is directed to a hard disk drive (HDD) assembly which has a simple structure and is easy to assemble and disassemble.

The present invention is directed to a server which has a simple structure and operation pattern and is easy to assemble and disassemble.

The present invention provides a handle module including a handle, a backing sheet, and a switch button. The handle has a body plate and a sidewall surrounding the border of the body plate. The body plate has a first opening and an inner surface inside the sidewall. The sidewall has a second opening. The backing sheet is disposed above the inner surface of the body plate. The switch button is disposed between the backing sheet and the inner surface and is suitable for moving back and forth along the length direction of the handle. The switch button has a first protrusion and a second protrusion. The protruding directions of the first protrusion and the second protrusion are perpendicular to each other. The first protrusion is protruded out of the first opening, and the second protrusion is protruded out of the second opening.

The present invention provides a HDD assembly including a tray, a HDD, a handle module, and a rubber pad. The tray has a pair of slide rails and a fixing hole. The fixing hole is disposed on one of the slide rails. The HDD is suitable for being inserted into or taken out of the tray along the slide rails. The handle module fastens the HDD in the tray. The handle module includes a handle, a backing sheet, and a switch button. The handle has a body plate and a sidewall surrounding the border of the body plate. The body plate has a first opening and an inner surface inside the sidewall. The sidewall has a second opening. The backing sheet is disposed above the inner surface of the body plate. The switch button is disposed between the backing sheet and the inner surface and is suitable for moving along the length direction of the handle. The switch button has a first protrusion and a second protrusion. The protruding directions of the first protrusion and the second protrusion are perpendicular to each other. The first protrusion is protruded out of the first opening, and the second protrusion is protruded out of the second opening and is suitable for being locked in the fixing hole to fasten the HDD in the tray. The rubber pad is disposed between the handle module and the HDD.

The present invention provides a server including a case, a main board, and a HDD assembly. The case has a mounting hole. The main board is disposed in the case. The HDD assembly set up in the case includes a tray, a HDD, a handle module, and a rubber pad. The tray has a pair of slide rails and a fixing hole disposed on one of the slide rails. The HDD is disposed in the tray. The handle module which fastens the HDD in the tray includes a handle, a backing sheet, and a switch button. The handle has a body plate and a sidewall surrounding the border of the body plate. The body plate has a first opening and an inner surface inside the sidewall. The sidewall has a second opening. The backing sheet is disposed above the inner surface of the body plate. The switch button is disposed between the backing sheet and the inner surface and is suitable for moving along the length direction of the handle. The switch button has a first protrusion and a second protrusion. The first protrusion is protruded out of the first opening. The protruding directions of the first protrusion and the second protrusion are perpendicular to each other. The second protrusion is protruded out of the second opening and passing through the fixing hole to be locked in the mounting hole, so that the HDD assembly is fastened in the case and the HDD is electrically connected to the main board. The rubber pad is disposed between the handle module and the HDD.

As described above, a handle module provided by the present invention offers a simple structure and is easy to assemble. By applying the handle module in a HDD assembly and a server, different component disassembly can be accomplished by locking a first protrusion of a switch button in a fixing hole of a tray or a mounting hole of a case.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
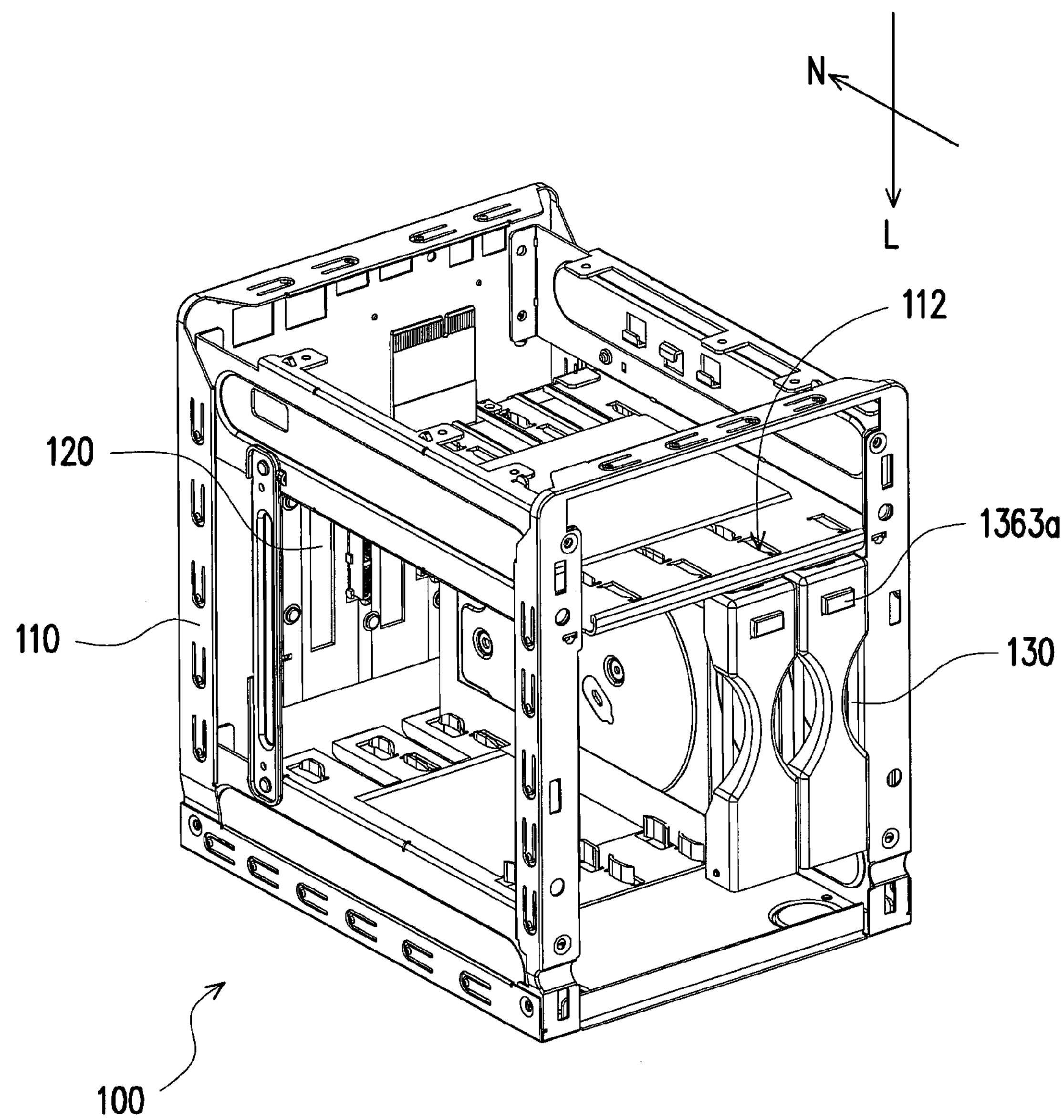
FIG. 1 is a diagram of a server.

Reference will now be made in detail to the present preferred embodiments of the invention, examples of which are illustrated in the accompanying drawings. Wherever possible, the same reference numbers are used in the drawings and the description to refer to the same or like parts.

Figure 2:
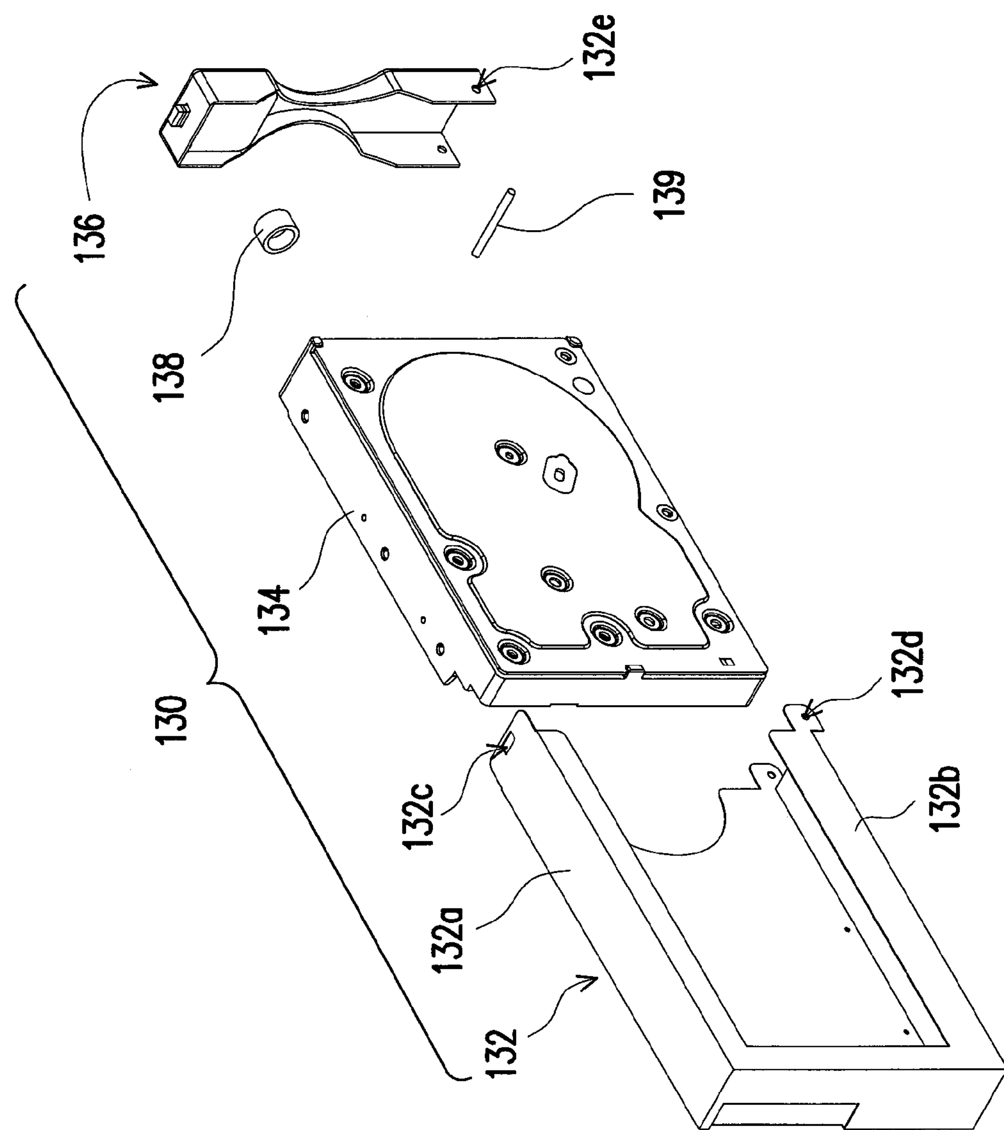
FIG. 2 is an exploded view of a hard disk drive (HDD) assembly.
Figure 3:
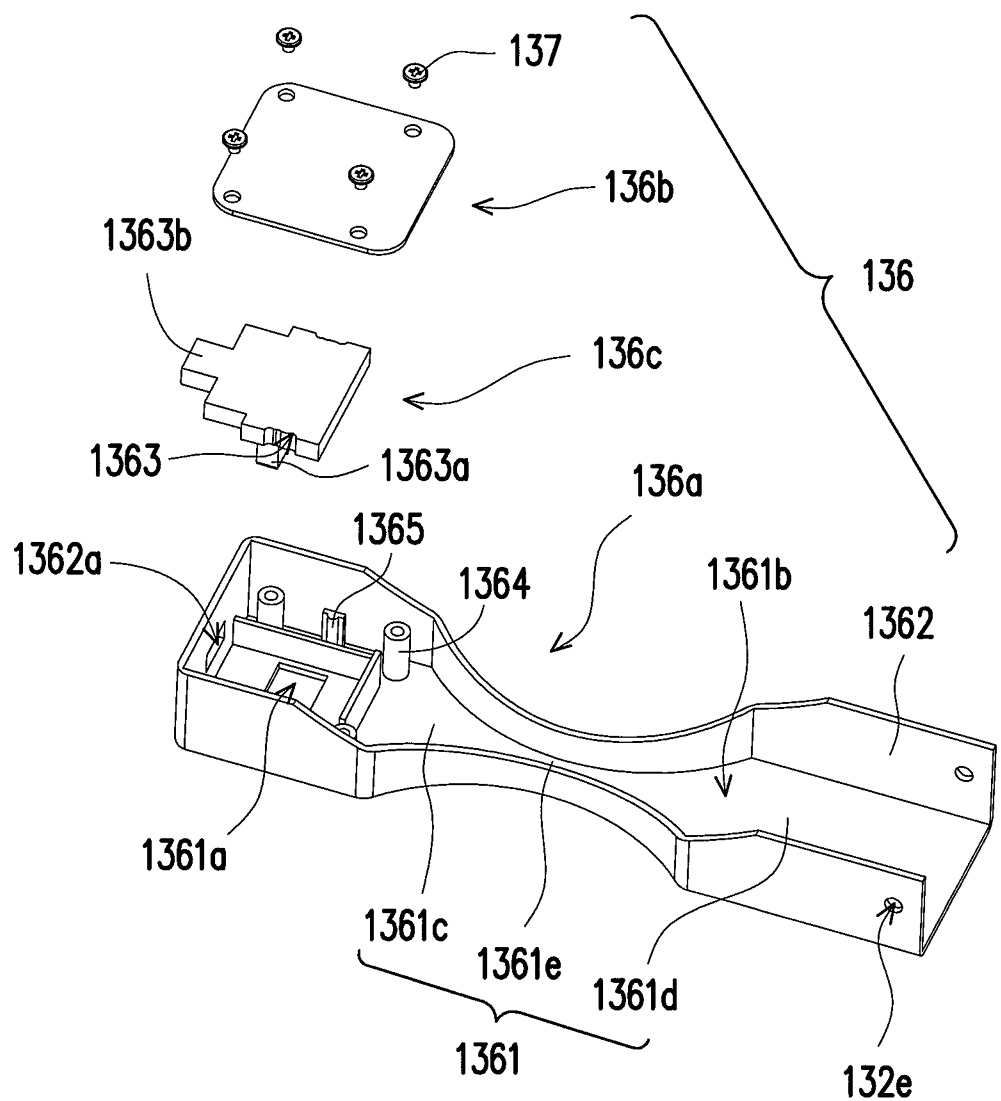
FIG. 3 is an exploded view of a handle module.

FIG. 1 is a diagram of a server. FIG. 2 is an exploded view of a hard disk drive (HDD) assembly. FIG. 3 is an exploded view of a handle module. Referring to FIG. 1, FIG. 2, and FIG. 3, the server 100 includes a case 110, a main board 120, and a HDD assembly 130. The case 110 of the server 100 has a mounting hole 112. The main board 120 is disposed in the case 110. The HDD assembly 130 is inserted into the case 110 along the normal direction N of the main board 120. The HDD assembly 130 installed in the case 110 includes a tray 132, a HDD 134, a handle module 136, and a rubber pad 138. The tray 132 has a pair of slide rails 132*a* and 132*b* and a fixing hole 132*c* disposed on the slide rail 132*a*. The position of the fixing hole 132*c* is corresponding to that of the mounting hole 112. The HDD 134 is usually disposed in the tray 132 and electrically connected to the main board 120 when the HDD assembly 130 is installed in the case 110. The HDD 134 and the main board 120 are usually electrically plugged together via a connector. The electrical connection between the HDD 134 and the main board 120 is not a technical feature of the present invention therefore will not be described herein. The rubber pad 138 is disposed between the handle module 136 and the HDD 134. When the handle module 136 is assembled on the tray 132 and the HDD 134 is installed in the tray 132, the rubber pad 138 helps to fasten the HDD 134 and buffer any external force. Thus, the HDD 134 can be fastened in the tray 132 without using any fastener, such as screw or tenon.

As described above, the handle module 136 is assembled to the tray 132 to fasten the HDD 134 in the tray 132. The handle module 136 includes a handle 136*a*, a backing sheet 136*b*, and a switch button 136*c*. The handle 136*a* has a body plate 1361 and a sidewall 1362 surrounding the border of the body plate 1361. The body plate 1361 has a first opening 1361*a* and an inner surface 1361*b* inside the sidewall 1362, and the sidewall 1362 has a second opening 1362*a*. The backing sheet 136*b* is disposed above the inner surface 1361*b* of the body plate 1361. The switch button 136*c* is disposed between the backing sheet 136*b* and the inner surface 1361*b* and is suitable for moving back and forth along the length direction L of the handle 136*a*. The switch button 136*c* has a first protrusion 1363*a* and a second protrusion 1363*b*. The first protrusion 1363*a* is protruded out of the first opening 1361*a*. The second protrusion 1363*b* is protruded out of the second opening 1362*a*. The protruding directions of the first protrusion 1363*a* and the second protrusion 1363*b* are perpendicular to each other. The number of components that can be disassembled from the server 100 (for example, the HDD assembly 130 taken out of the case 110, or the HDD 134 taken out of the tray 132) is determined by the relative position between the first protrusion 1363*a* and the first opening 1361*a*, the fixing hole 132*c*, and the mounting hole 112.

The handle 136*a* is divided into a first part 1361*c*, a second part 1361*d*, and a necking part 1361*e*. The necking part 1361*e* is connected between the first part 1361*c* and the second part 1361*d*. The first opening 1361*a* is disposed at the first part 1361*c*. Besides, the backing sheet 136*b* and the switch button 136*c* are also disposed at the first part 1361*c*. The backing sheet 136*b* and the switch button 136*c* may be very long and extended through the necking part 1361*e* to reach the second part 1361*d*. However, in the present embodiment, the lengths of the backing sheet 136*b* and the switch button 136*c* allow them to be enclosed within the range of the first part 1361*c*, so that the material cost can be kept low.

In addition, the handle 136*a* further has a rib 1364 disposed on the inner surface 1361*b* of the body plate 1361. The backing sheet 136*b* is assembled to the rib 1364. To be specific, the backing sheet 136*b* may be closely fitted, locked, or fastened to the rib 1364. In the present embodiment, the server 100 further includes a fastener 137 (for example, a screw). The fastener 137 passes through the backing sheet 136*b* and locked in the rib 1364 to fasten the backing sheet 136*b* on the rib 1364 and locate the switch button 136*c* between the backing sheet 136*b* and the inner surface 1361*b* of the body plate 1361.

Figure 4:
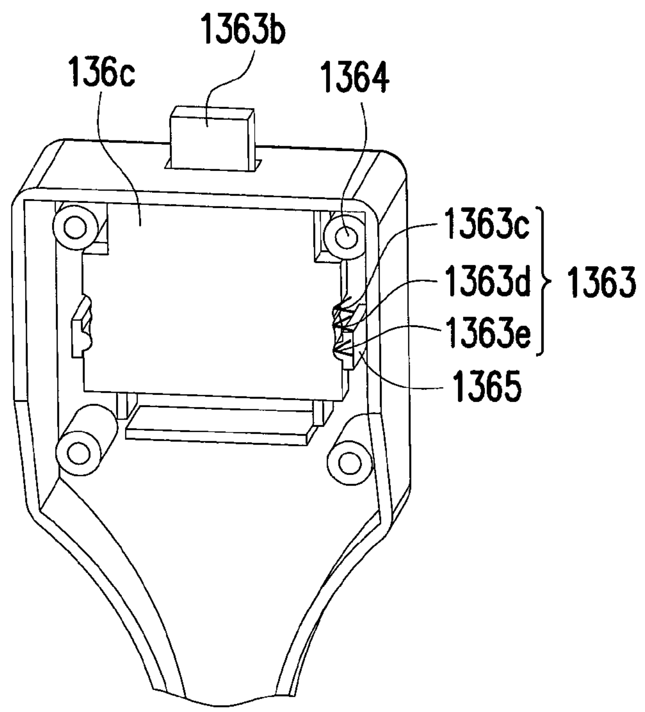
FIG. 4 is a diagram of a body plate and a switch button.
Figure 5:
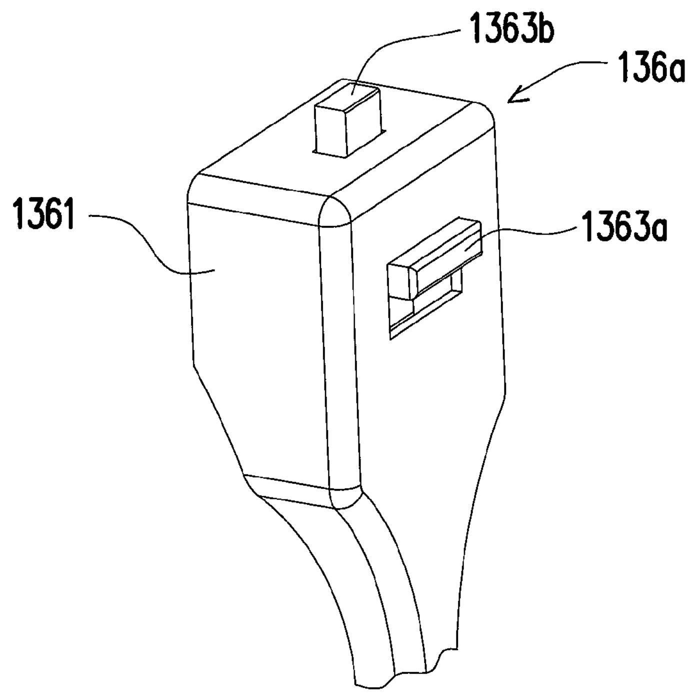
FIG. 5 is an external view of the body plate and the switch button in FIG. 4.

FIG. 4 is a diagram of a body plate and a switch button. FIG. 5 is an external view of the body plate and the switch button in FIG. 4. Referring to both FIG. 4 and FIG. 5, the handle 136*a* further has a pair of limiting spring arms 1365 disposed on the inner surface 1361*b* of the body plate 1361, each of opposite sides of the switch button 136*c* has three pairs of grooves 1363, and the limiting spring arms 1365 are locked with one pair of the grooves 1363. In order to distinguish the three pairs of grooves conveniently, the three pairs of grooves are identified as a first pair of grooves 1363*c* closest to the second opening 1362*a*, a third pair of grooves 1363*e* farthest from the second opening 1362*a*, and a second pair of grooves 1363*d* located between the first pair of grooves 1363*c* and the second pair of grooves 1363*e*. Following three states can be accomplished by respectively locking the limiting spring arms 1365 with one pair of the grooves 1363: the handle module 136 is open relative to the tray 132 so that the HDD 134 can be taken out of the tray 132; the handle module 136 and the tray 132 limit each other so that the HDD 134 is fastened in the tray 132, but the HDD assembly 130 can be taken out of the case 110; and the handle module 136, the HDD assembly 130, and the case 110 limit each other so that the HDD assembly 130 is fastened in the case 110. Below, these three states will be respectively explained in detail.

Referring to FIG. 1, FIG. 2, and FIG. 3 again, the HDD assembly 130 further has a mounting shaft 139, the slide rail 132*b* of the tray 132 has a pair of first shaft holes 132*d*, and the handle 136*a* has a pair of second shaft holes 132*e*. The mounting shaft 139 is disposed to pass through the first shaft holes 132*d* and the second shaft holes 132*e* to assemble the handle module 136 and the tray 132 together. The handle 136*a* and the tray 132 are assembled together through the mounting shaft 139 so that the handle 136*a* can be opened and closed relative to the tray 132 with the mounting shaft 139 as its rotation axis. In the present embodiment, the second shaft holes 132*e* are disposed at the second part 1361*d* of the handle 136*a*, and the first shaft holes 132*d* are disposed on the relative lower slide rail 132*b* of the tray 132.

Figure 6:
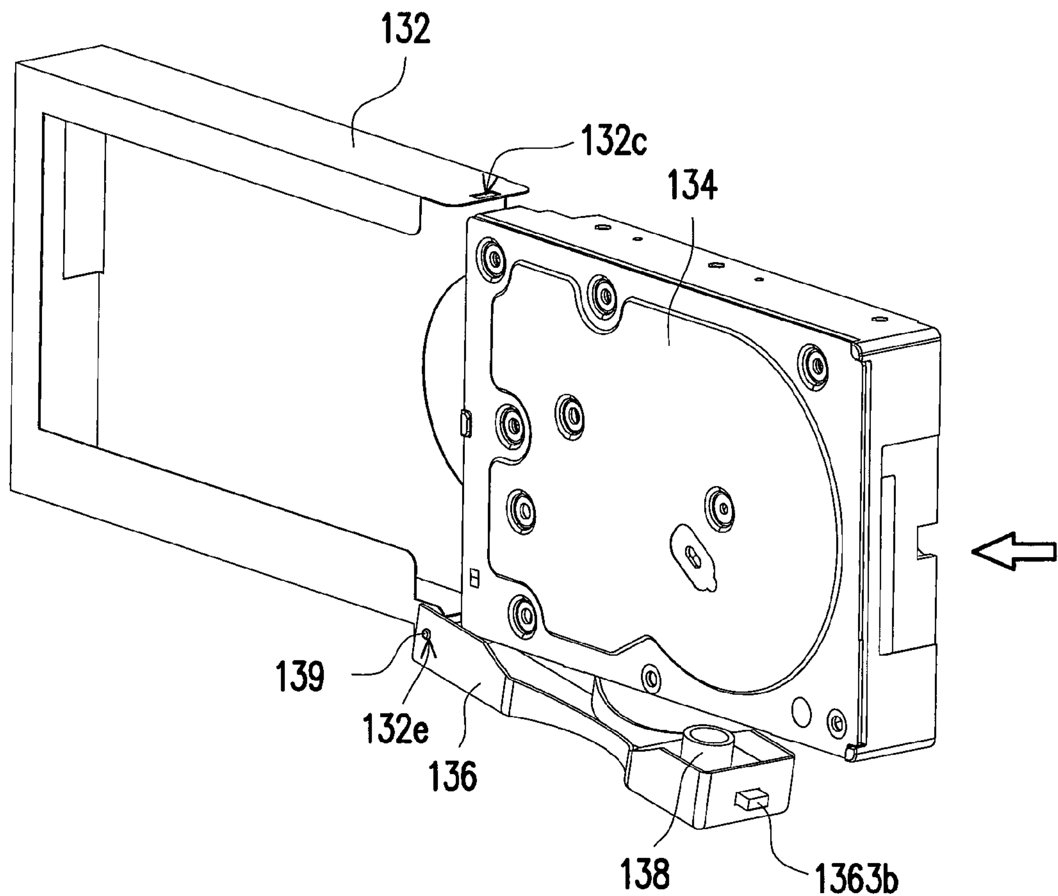
FIG. 6 is a diagram illustrating a HDD to be assembled into a tray.
Figure 7:
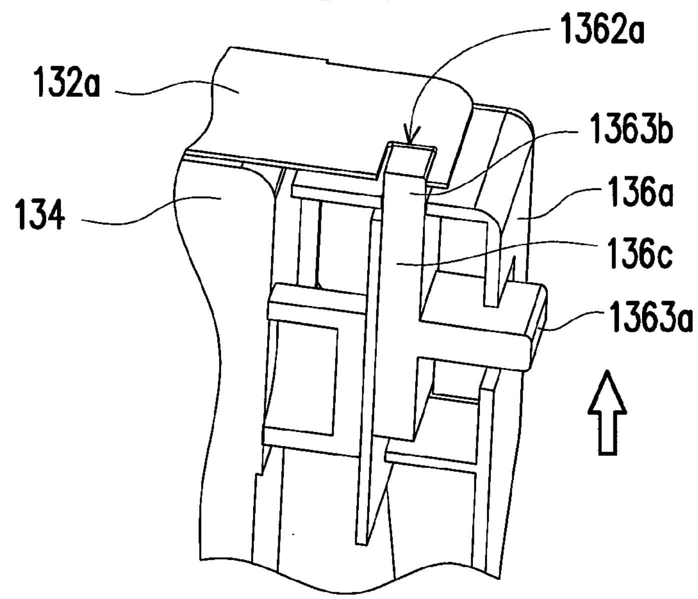
FIG. 7 is a diagram illustrating a switch button not limited by a tray.
Figure 8:
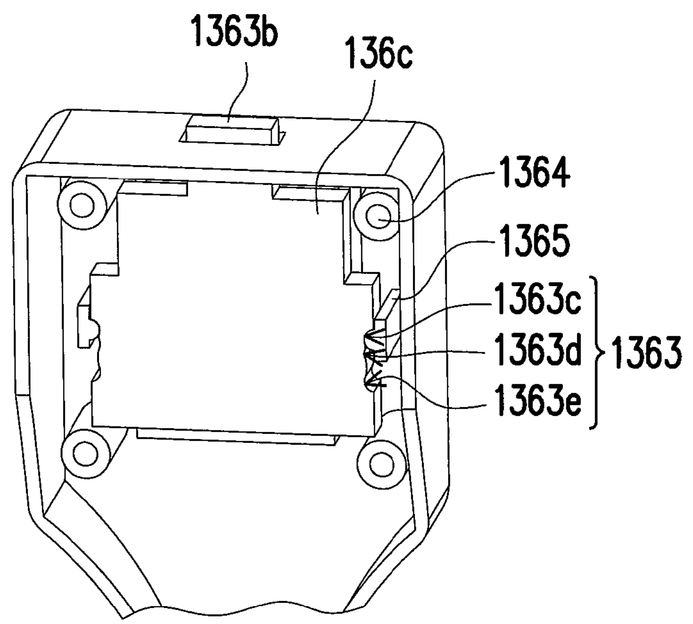
FIG. 8 is a diagram illustrating limiting spring arms locked with a first pair of grooves closest to a second opening.

FIG. 6 is a diagram illustrating a HDD to be assembled into a tray, and FIG. 7 is a diagram illustrating a switch button not limited by a tray. Referring to both FIG. 6 and FIG. 7, after the handle module 136 and the tray 132 are assembled together through the mounting shaft 139, the first shaft holes 132*d*, and the second shaft holes 132*e*, a user pushes the HDD 134 into the tray 132 along the slide rails 132*a* and 132*b* and then rotate the handle 136*a* relative to the tray 132 around the mounting shaft 139. As a result, the first part 1361*c* of the handle 136*a* is rotated closer to the tray 132, and the handle module 136 encloses the HDD 134 in the tray 132. It should be mentioned herein that a rubber 138 can be placed between the HDD 134 and the handle 136*a* before the handle 136*a* of the handle module 136 is rotated to enclose the HDD 134 in the tray 132. Herein the limiting spring arms 1365 of the handle 136*a* are locked with the first pair of grooves 1363*c* which are closest to the second opening 1362*a* (as shown in FIG. 8), while the handle module 136 and the tray 132 do not limit each other yet. In other words, the handle 136*a* can be easily opened or closed relative to the tray 132.

Figure 9:
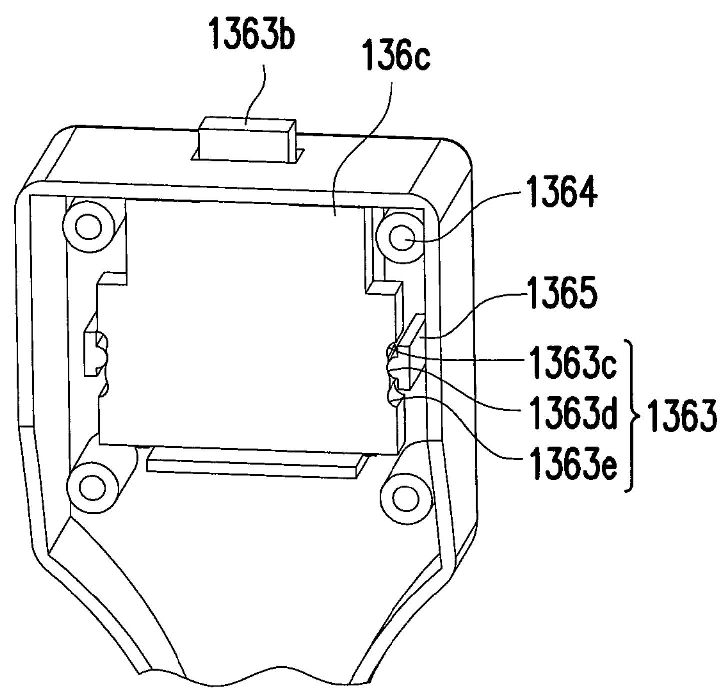
FIG. 9 is a diagram illustrating limiting spring arms locked with a second pair of grooves in the middle.

Next, the user can push the first protrusion 1363*a* outside the handle 136*a* upwards to move the switch button 136*c* along the length direction L of the handle 136*a*, so as to lock the limiting spring arms 1365 of the handle 136*a* with the second pair of grooves 1363*d* in the middle (as shown in FIG. 9). Accordingly, the second protrusion 1363*b* of the switch button 136*c* is protruded further more out of the second opening 1362*a* and inserted into the fixing hole 132*c*. In this case, the handle module 136 and the tray 132 limit each other, and the HDD 134 is fastened in the tray 132.

Figure 10:
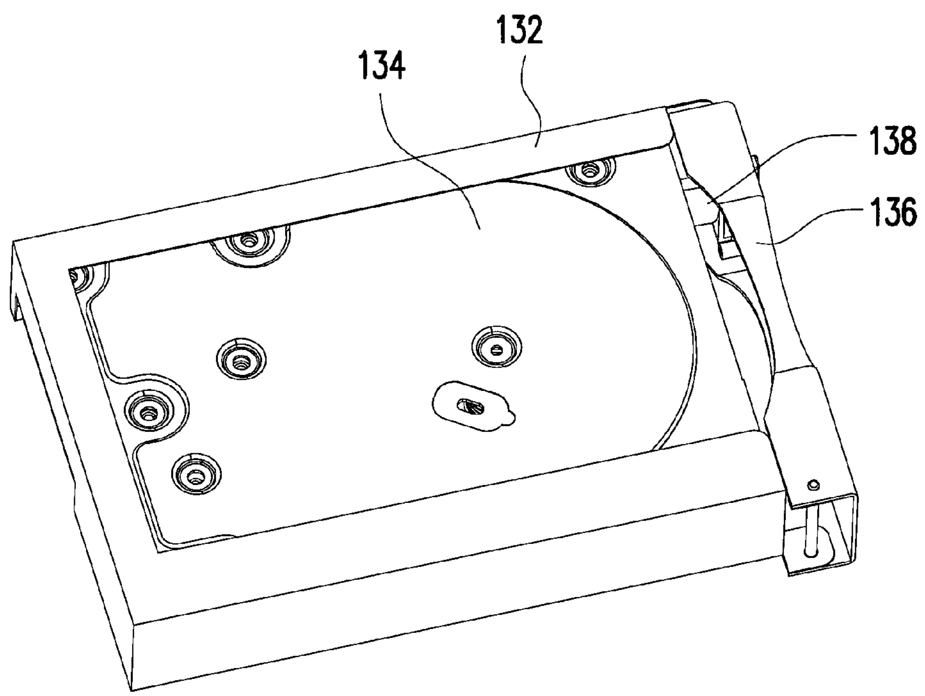
FIG. 10 is a diagram illustrating a rubber pad disposed between a HDD and a handle module.

Moreover, it should be noted that a manufacturing tolerance may exist when the components of the handle module 136 and the tray 132 are manufactured. By adopting the rubber pad 138, the gap between the handle 136*a* of the handle module 136 and the HDD 134 caused by the manufacturing tolerance can be eliminated, so that the HDD 134 can be effectively pressed to reduce the possibility of the HDD 134 swaying in the tray 132 (as shown in FIG. 10), and any external force can be buffered to prevent the HDD 134 from being damaged.

When the second protrusion 1363*b* is protruded out of the second opening 1362*a* and locked in the fixing hole 132*c*, the limiting spring arms 1365 are locked with the second pair of grooves 1363*d* which are relatively closer to the second opening 1362*a*, and the HDD assembly 130 is suitable for being taken out of the case 110. When the second protrusion 1363*b* is protruded out of the second opening 1362*a* and passing through the fixing hole 132*c* to be locked in the mounting hole 112, the limiting spring arms 1365 are locked with the third pair of grooves 1363*e* that are farthest from the second opening 1362*a*, and the HDD assembly 130 is fastened in the case 110.

Figure 11:
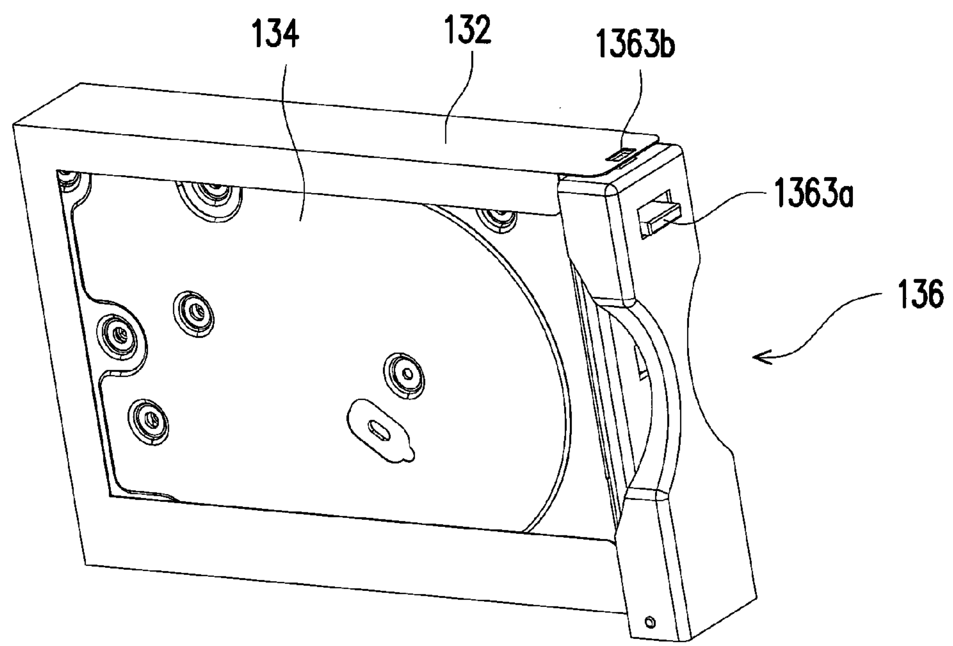
FIG. 11 is a diagram illustrating how a HDD is taken out of a tray by using a handle.

To take the HDD 134 out of the tray 132, the first protrusion 1363*a* is pushed in the opposite direction (i.e., downwards along the length direction L (as indicated in FIG. 1) of the handle 136*a*) to move the limiting spring arms 1365 away from the second pair of grooves 1363*d* and lock the limiting spring arms 1365 with the first pair of grooves 1363*c* that are relatively closer to the second opening 1362*a*. With the movement of the switch button 136*c*, the locking between the second protrusion 1363*b* and the fixing hole 132*c* is released. Thus, the handle 136*a* can be rotated around the mounting shaft 139 again to move the first part 1361*c* away from the tray 132, so that the HDD 134 can be taken out of the tray 132 (as shown in FIG. 11).

Figure 12:
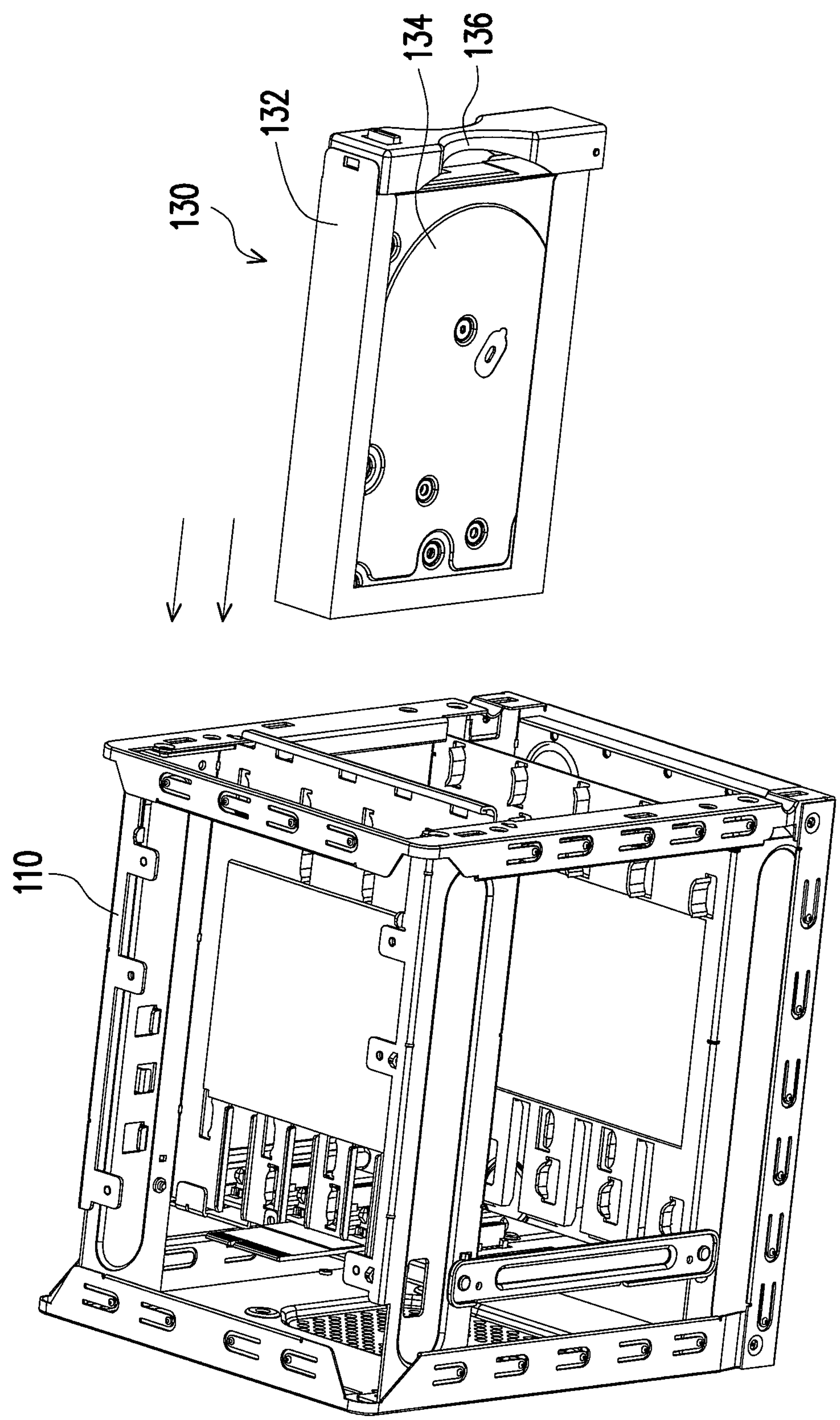
FIG. 12 is a diagram illustrating how a HDD assembly is assembled to a case.
Figure 13:
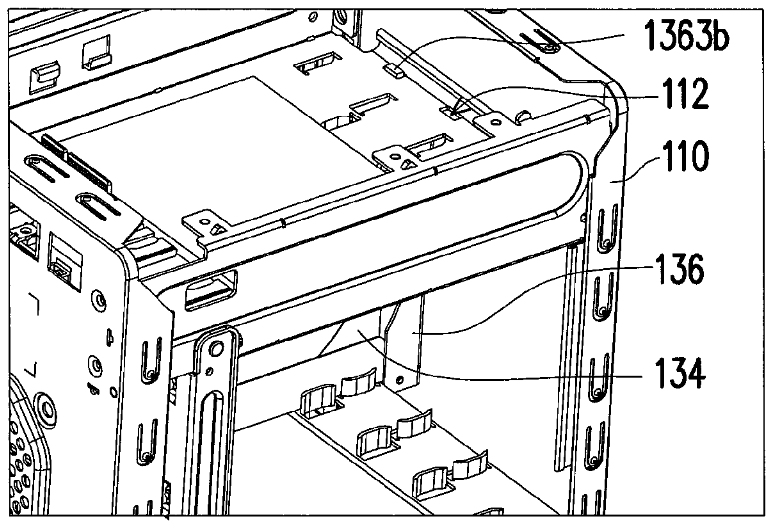
FIG. 13 is a diagram illustrating how a HDD assembly and a case are assembled together.
Figure 14:
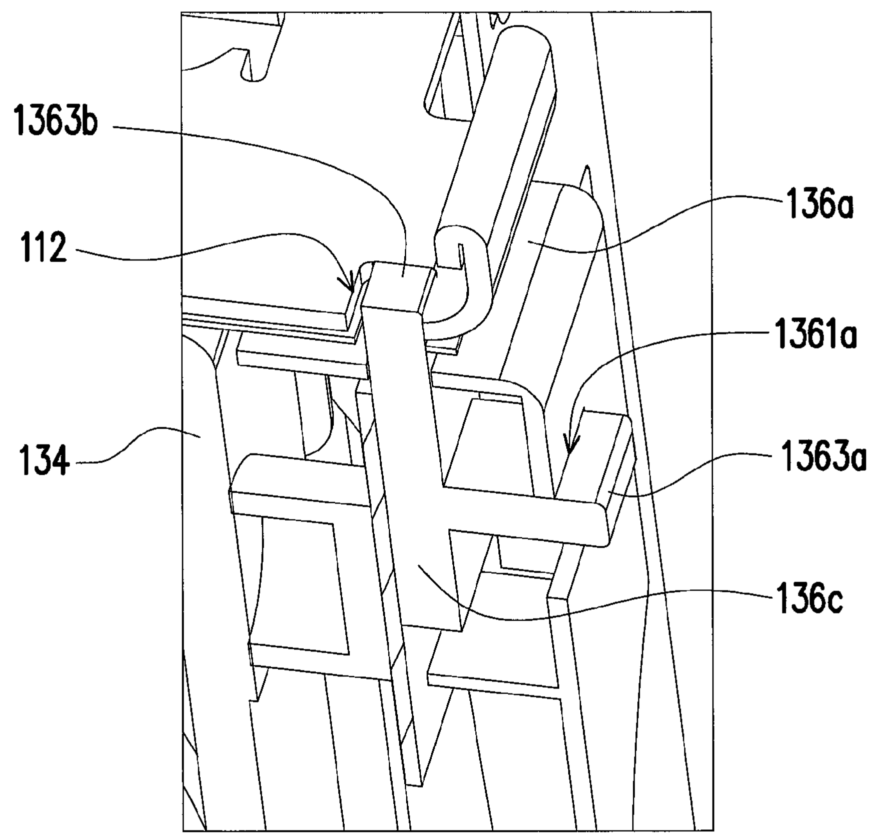
FIG. 14 is a diagram illustrating how a HDD assembly and a case limit each other.

FIG. 12 is a diagram illustrating how a HDD assembly is assembled to a case, FIG. 13 is a diagram illustrating how a HDD assembly and a case are assembled together, and FIG. 14 is a diagram illustrating how a HDD assembly and a case limit each other. Referring to FIG. 12, FIG. 13, and FIG. 14, the HDD assembly 130 is assembled to the case 110 so that the HDD 134 of the HDD assembly 130 is electrically connected to the main board 120, and the server 100 starts to provide its functions. To be specific, when the HDD assembly 130 is placed into the case 110, the first protrusion 1363*a* of the switch button 136*c* protruded out of the first opening 1361*a* of the handle 136*a* is pushed upwards along the length direction L of the handle 136*a* (similar to the method of fastening the HDD 134 in the tray 132 by using the handle module 136), so that the limiting spring arms 1365 are locked with the third pair of grooves 1363*e* which are farthest from the second opening 1362*a*, and the second protrusion 1363*b* is protruded further more out of the fixing hole 132*c*. Meanwhile, because the fixing hole 132*c* of the tray 132 and the mounting hole 112 of the case 110 are disposed correspondingly, the second protrusion 1363*b* is further locked in the mounting hole 112. Thus, the HDD assembly 130 and the case 110 limit each other.

Figure 15:
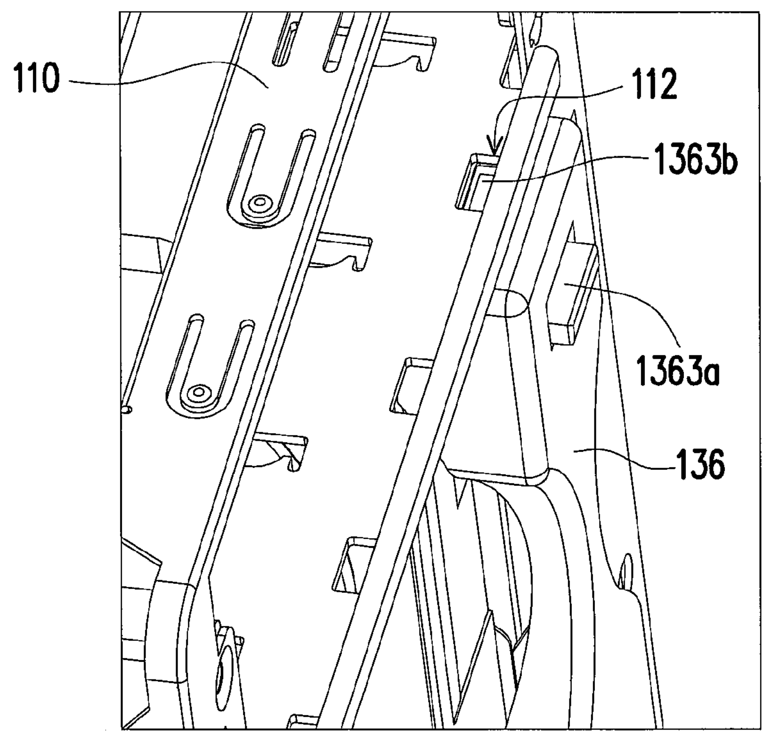
FIG. 15 is a diagram illustrating a HDD assembly to be disassembled from a case.
Figure 16:
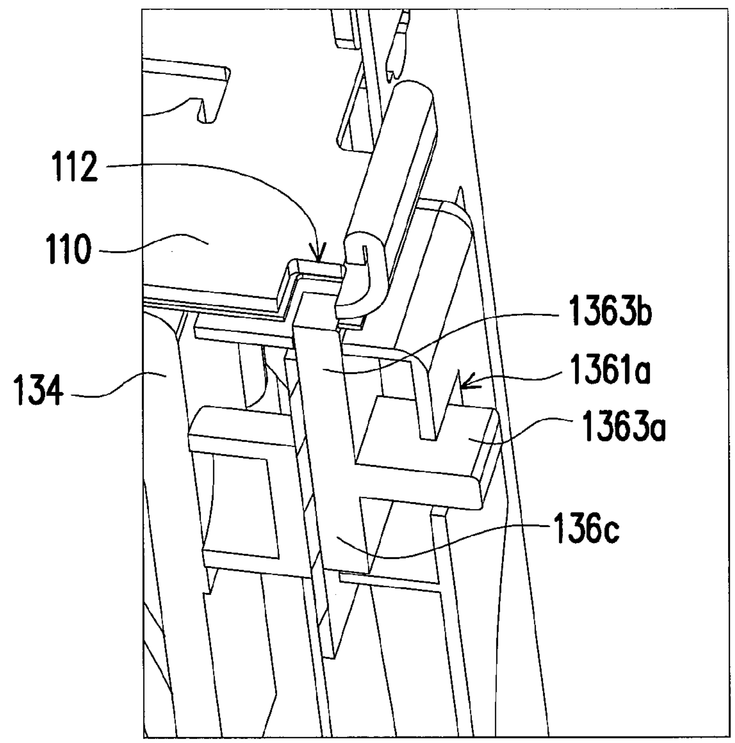
FIG. 16 is a diagram illustrating how the position limitation between a HDD assembly and a case is released.

FIG. 15 is a diagram illustrating a HDD assembly to be disassembled from a case, and FIG. 16 is a diagram illustrating how the position limitation between a HDD assembly and a case is released. Referring to FIG. 15 and FIG. 16, to disassemble the HDD assembly 130 from the case 110, the first protrusion 1363*a* of the switch button 136*c* is pushed downwards along the length direction L of the handle 136*a*, so that the limiting spring arms 1365 are moved away from the third pair of grooves 1363*e* and locked with the second pair of grooves 1363*d*. Through the movement of the switch button 136*c*, the position limitation between the second protrusion 1363*b* and the mounting hole 112 is released. Thus, the HDD assembly 130 can be taken out of the case 110.

As described above, the present invention provides a handle module which offers a simple structure and is easy to assemble and use. When the handle module is applied to a HDD assembly or a server, the different numbers of components can be disassembled from the HDD assembly or the server based on the relative position between a first protrusion of a switch button and a first opening, between a first protrusion of a switch button and a fixing hole of a tray, or between a first protrusion of a switch button and a mounting hole of a case. Thereby, the HDD assembly or the server is very convenient to be used for a user.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handle module, comprising:

a handle, having a body plate and a sidewall surrounding a border of the body plate, wherein the body plate has a first opening and an inner surface inside the sidewall, and the sidewall has a second opening;

a backing sheet, disposed above the inner surface of the body plate; and a switch button, disposed between the backing sheet and the inner surface, and suitable for moving back and forth along a length direction of the handle, wherein the switch button has a first protrusion and a second protrusion, protruding directions of the first protrusion and the second protrusion are perpendicular to each other, the first protrusion is protruded out of the first opening, and the second protrusion is protruded out of the second opening.

2. The handle module according to claim 1, wherein the handle is divided into a first part, a second part, and a necking part connected between the first part and the second part, and the first opening is disposed at the first part.

3. The handle module according to claim 1, wherein the handle further has a rib disposed on the inner surface of the body plate, and the backing sheet is assembled to the rib.

4. The handle module according to claim 3 further comprising a fastener, wherein the fastener passes through the backing sheet and is locked in the rib.

5. The handle module according to claim 1, wherein the handle further has a pair of limiting spring arms disposed on the inner surface of the body plate, three pairs of grooves are respectively disposed at two opposite sides of the switch button, and the limiting spring arms are locked with one pair of the grooves.

6. A hard disk drive (HDD) assembly, comprising:

a tray, having a pair of slide rails and a fixing hole, wherein the fixing hole is disposed on one of the slide rails;

a HDD, suitable for being inserted into or taken out of the tray along the slide rails;

a handle module, fastening the HDD in the tray, wherein the handle module comprises:

a handle, having a body plate and a sidewall surrounding a border of the body plate, wherein the body plate has a first opening and an inner surface inside the sidewall, and the sidewall has a second opening;

a backing sheet, disposed above the inner surface of the body plate;

a switch button, disposed between the backing sheet and the inner surface, and suitable for moving along a length direction of the handle, wherein the switch button has a first protrusion and a second protrusion, protruding directions of the first protrusion and the second protrusion are perpendicular to each other, the first protrusion is protruded out of the first opening, the second protrusion is protruded out of the second opening and is suitable for being locked in the fixing hole to fasten the HDD in the tray; and a rubber pad, disposed between the handle module and the HDD.

7. The HDD assembly according to claim 6, wherein the handle is divided into a first part, a second part, and a necking part connected between the first part and the second part, and the first opening is disposed at the first part.

8. The HDD assembly according to claim 6, wherein the handle further has a rib disposed on the inner surface of the body plate, and the backing sheet is assembled to the rib.

9. The HDD assembly according to claim 8 further comprising a fastener, wherein the fastener passes through the backing sheet and is locked in the rib.

10. The HDD assembly according to claim 6, wherein the handle further has a pair of limiting spring arms disposed on the inner surface of the body plate, three pairs of grooves are respectively disposed at two opposite sides of the switch button, and the limiting spring arms are locked with one pair of the grooves.

11. The HDD assembly according to claim 10, wherein when the second protrusion is protruded out of the second opening and locked in the fixing hole, the limiting spring arms are locked with the second pair of grooves or the third pair of grooves which are relatively closer to the second opening.

12. The HDD assembly according to claim 6 further comprising a mounting shaft, wherein the slide rails of the tray have a pair of first shaft holes, the handle has a pair of second shaft holes, and the mounting shaft passes through the first shaft holes and the second shaft holes to assemble the handle module and the tray together.

13. A server, comprising:

a case, having a mounting hole;

a main board, disposed in the case;

a HDD assembly, set up in the case, wherein the HDD assembly comprises:

a tray, having a pair of slide rails and a fixing hole, wherein the fixing hole is disposed on one of the slide rails;

a HDD, disposed in the tray;

a handle module, fastening the HDD in the tray, wherein the handle module comprises:

a handle, having a body plate and a sidewall surrounding a border of the body plate, wherein the body plate has a first opening and an inner surface inside the sidewall, and the sidewall has a second opening;

a backing sheet, disposed above the inner surface of the body plate;

a switch button, disposed between the backing sheet and the inner surface, and suitable for moving along a length direction of the handle, wherein the switch button has a first protrusion and a second protrusion, protruding directions of the first protrusion and the second protrusion are perpendicular to each other, the second protrusion is protruded out of the second opening and passing through the fixing hole to be locked in the mounting hole, so that the HDD assembly is fastened in the case and the HDD is electrically connected to the main board, and the first protrusion is protruded out of the first opening; and a rubber pad, disposed between the handle module and the HDD.

14. The server according to claim 13, wherein the handle is divided into a first part, a second part, and a necking part connected between the first part and the second part, and the first opening is disposed at the first part.

15. The server according to claim 13, wherein the handle further has a rib disposed on the inner surface of the body plate, and the backing sheet is assembled to the rib.

16. The server according to claim 15, wherein HDD assembly further comprises a fastener, and the fastener passes through the backing sheet and is locked in the rib.

17. The server according to claim 13, wherein the handle further has a pair of limiting spring arms disposed on the inner surface of the body plate, three pairs of grooves are respectively disposed at two opposite sides of the switch button, and the limiting spring arms are locked with one pair of the grooves.

18. The server according to claim 17, wherein when the second protrusion is protruded out of the second opening and locked in the fixing hole, the limiting spring arms are locked with the second pair of grooves which are relatively closer to the second opening, and the HDD assembly is suitable for being taken out of the case.

19. The server according to claim 17, wherein when the second protrusion is protruded out of the second opening and passing through the fixing hole to be locked in the mounting hole, the limiting spring arms are locked with the third pair of grooves which are farthest to the second opening, and the HDD assembly is fastened in the case.

20. The server according to claim 13, wherein the HDD assembly further comprises a mounting shaft, the slide rails of the tray have a pair of first shaft holes, the handle has a pair of second shaft holes, and the mounting shaft is passing through the first shaft holes and the second shaft holes to assemble the handle module and the tray together.

* * * * *